(12) United States Patent
Sekine et al.

(10) Patent No.: US 10,953,657 B2
(45) Date of Patent: Mar. 23, 2021

(54) INK JET PRINTING APPARATUS AND PRINTING HEAD

(71) Applicant: Seiko Epson Corporation, Tokyo (JP)

(72) Inventors: Midori Sekine, Matsumoto (JP); Tomohiro Numajiri, Shiojiri (JP); Keitaro Nakano, Matsumoto (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/684,669

(22) Filed: Nov. 15, 2019

(65) Prior Publication Data

US 2020/0156375 A1    May 21, 2020

(30) Foreign Application Priority Data

Nov. 16, 2018 (JP) .............................. JP2018-215662

(51) Int. Cl.
| | |
|---|---|
| *B41J 2/165* | (2006.01) |
| *B41J 2/16* | (2006.01) |
| *C09D 11/10* | (2014.01) |
| *C09D 11/30* | (2014.01) |
| *C09D 11/101* | (2014.01) |

(52) U.S. Cl.
CPC ............ *B41J 2/165* (2013.01); *B41J 2/1606* (2013.01); *B41J 2/16517* (2013.01); *C09D 11/10* (2013.01); *B41J 2002/16502* (2013.01); *C09D 11/101* (2013.01); *C09D 11/30* (2013.01)

(58) Field of Classification Search
CPC ...... B41J 2/1606; B41J 2/165; B41J 2/16517; B41J 11/002; B41J 2002/16502; C09D 11/10; C09D 11/101; C09D 11/30; C09D 11/322
See application file for complete search history.

(56) References Cited

U.S. PATENT DOCUMENTS

| | | | |
|---|---|---|---|
| 6,966,630 B2 * | 11/2005 | Sasaki | ..................... B41J 2/1606 347/45 |
| 7,232,206 B2 * | 6/2007 | Sasaki | ..................... B41J 2/1606 347/45 |
| 7,735,750 B2 | 6/2010 | Kaneko et al. | |
| 2006/0214210 A1 | 9/2006 | Itokawa et al. | |
| 2010/0245416 A1 * | 9/2010 | Ohshima | .............. B41M 5/0023 347/9 |
| 2014/0092168 A1 * | 4/2014 | Ito | ......................... B41J 2/16552 347/21 |
| 2017/0072695 A1 * | 3/2017 | Fukuda | ................ B41J 2/16526 |
| 2018/0339500 A1 * | 11/2018 | Hulke | .................... B32B 27/20 |

FOREIGN PATENT DOCUMENTS

| | | |
|---|---|---|
| EP | 2484526 | 8/2012 |
| JP | 2006-199023 | 8/2006 |
| JP | 2006-269800 | 10/2006 |
| JP | 2012-011628 | 1/2012 |
| JP | 2012-179900 | 9/2012 |
| JP | 2016-124111 | 7/2016 |

* cited by examiner

*Primary Examiner* — Anh T Vo
(74) *Attorney, Agent, or Firm* — Harness, Dickey & Pierce, P.L.C.

(57) ABSTRACT

An ink jet printing apparatus includes a radiation-curable ink having a surface tension of 25.0 mN/m or less, and a printing head including a nozzle face having an opening of a nozzle through which the radiation-curable ink is ejected, and a liquid-repellent film on the nozzle face. The liquid-repellent film enables the radiation-curable ink to forms a contact angle of 60.0 degrees or more therewith.

9 Claims, 2 Drawing Sheets

INK JET PRINTING APPARATUS AND PRINTING HEAD

The present application is based on, and claims priority from, JP Application Serial Number 2018-215662, filed Nov. 16, 2018, the disclosure of which is hereby incorporated by reference herein in its entirety.

BACKGROUND

1. Technical Field

The present disclosure relates to an ink jet printing apparatus and a printing head.

2. Related Art

An ink jet printing method is a technique for printing performed by ejecting ink droplets through very thin nozzles to apply the ink droplets onto a printing medium. This method enables high-speed printing of a high-definition, high-quality image pattern with a relatively inexpensive apparatus.

Apparatuses used in such an ink jet printing method, which employ a technique of ejecting ink from a printing head, are broadly developed for high-quality printing from a variety of viewpoints. For example, it is desired that the printing head of an ink jet printing apparatus consistently ejects ink through the nozzles. From the viewpoint of reducing ejection failure caused by contamination, JP-A-2016-124111 discloses a printing head provided with a water-repellent film on which water has a large contact angle, facilitating the wiping of the nozzle face of the printing head.

Ink jet printing can be performed by using a downsized apparatus and does not require a printing plate, suitable for producing printed items by small-volume, multi-lot printing, such as label printing and sign printing. Printed items, such as labels, signs, or the like may be produced by, for example, applying a radiation-curable ink capable of being cured by UV or visible light radiation onto a plastic film or board, and curing the ink with UV light or visible light.

As used in JP-A-2016-124111, the main constituent of aqueous ink is water. Since water has a high surface tension, aqueous ink is beneficial for increasing the contact angle with the water-repellent film, facilitating wiping. In contrast, curable inks contain a polymerizable compound, that is, an organic compound, as the main constituent. Inks mainly containing an organic compound are not likely to have a high surface tension, accordingly forming a small contact angle with the members of the head. In addition, when a curable ink is applied onto a member, the droplets of the ink themselves can harden. Such an ink may not be efficiently wiped or cleaned even if the head is provided with a surface capable of forming a large contact angle with the ink.

SUMMARY

According to an aspect of the present disclosure, there is provided an ink jet printing apparatus including a radiation-curable ink having a surface tension of 25.0 mN/m or less, and a printing head including a nozzle face having an opening of a nozzle through which the radiation-curable ink is ejected and a liquid-repellent film on the nozzle face. The radiation-curable ink forms a contact angle of 60.0 degrees or more with the liquid-repellent film.

In an embodiment of the ink jet printing apparatus according to the present disclosure, the liquid-repellent film may contain a fluorine-containing organosilicon compound.

In an embodiment of the ink jet printing apparatus according to the present disclosure, the liquid-repellent film may contain a perfluoroalkyleneoxy structure.

In an embodiment of the ink jet printing apparatus according to the present disclosure, the liquid-repellent film may contain the structure represented by the following formula (I): $-(CF_2)_2-O$.

In an embodiment of the ink jet printing apparatus according to the present disclosure, the liquid-repellent film may not contain a compound having the structure represented by the following formula (II): $-O-CF_2-O-$.

In an embodiment of the ink jet printing apparatus according to the present disclosure, the surface tension of the radiation-curable ink may be 22.0 mN/m or less.

In an embodiment of the ink jet printing apparatus according to the present disclosure, the liquid-repellent films may enable the radiation-curable ink to form a contact angle of 64.0 degrees or more therewith.

According to another aspect of the present disclosure, there is provided a printing head including a nozzle face having an opening of a nozzle through which a radiation-curable ink having a surface tension of 25.0 mN/m or less is ejected, and a liquid-repellent film on the nozzle face. The liquid-repellent film enables the radiation-curable ink to form a contact angle of 60.0 degrees or more therewith.

In an embodiment of the printing head according to the present disclosure, the surface tension of the radiation-curable ink may be 22.0 mN/m or less.

In an embodiment of the printing head according to the present disclosure, the liquid-repellent film may enable the radiation-curable ink to form a contact angle of 64.0 degrees or more therewith.

DESCRIPTION OF EXEMPLARY EMBODIMENTS

Figure 1:
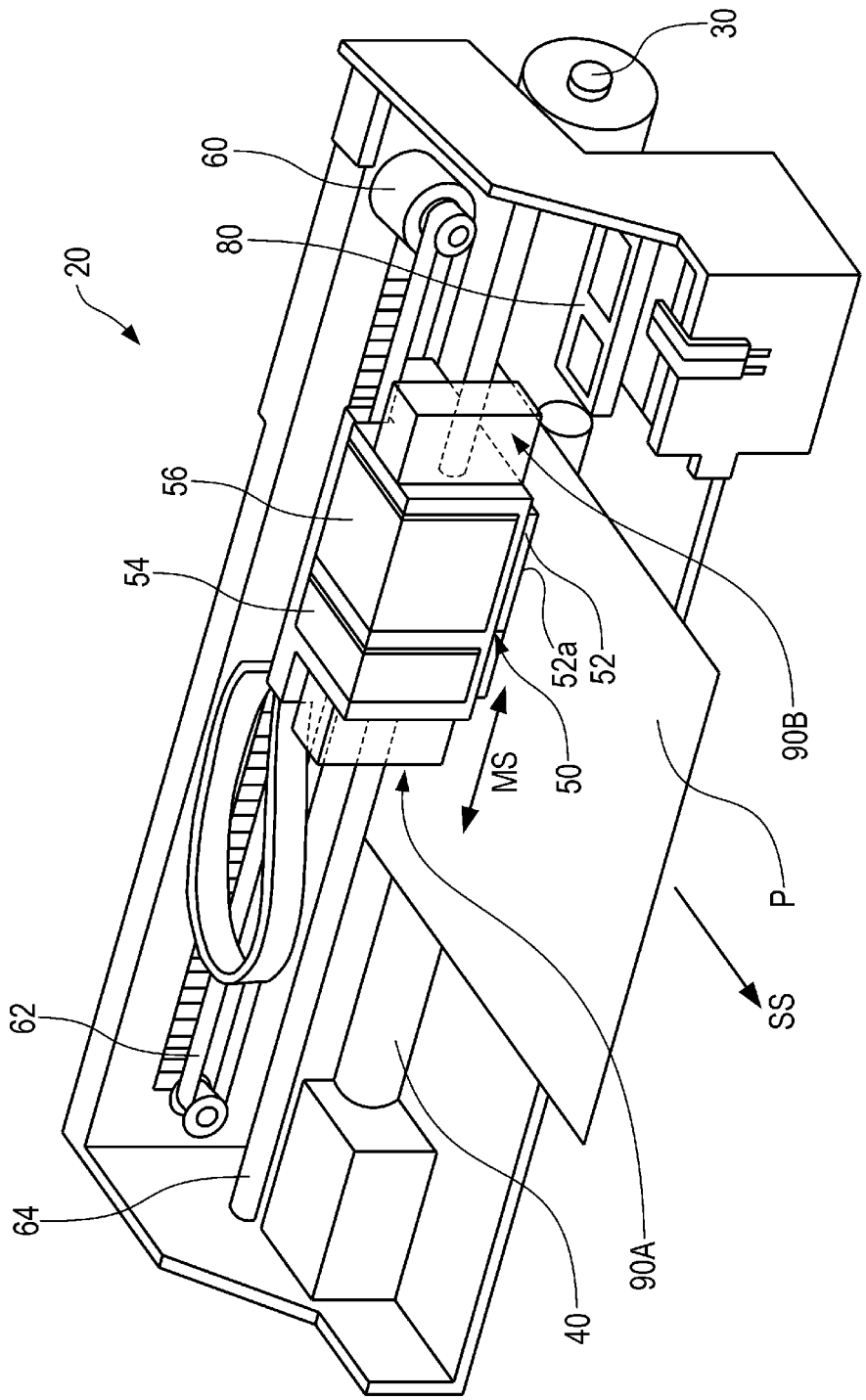
FIG. 1 is a perspective view of an ink jet printing apparatus according to an embodiment of the present disclosure.

Some of the embodiments of the present disclosure will now be described. The following embodiments illustrate some implementations of the present disclosure. The implementation of the subject matter of the disclosure is not limited to the following embodiments, and various modifications may be made within the scope and spirit of the disclosure. All the components disclosed in the following embodiments are not necessarily essential for the subject matter disclosed herein.

1. Ink Jet Printing Apparatus

The ink jet printing apparatus according to an embodiment of the present disclosure includes a radiation-curable ink having a surface tension of 25.0 mN/m or less, and a printing head including a nozzle face having an opening of a nozzle through which the radiation-curable ink is ejected.

1.1. Radiation-Curable Ink

The radiation-curable ink of the ink jet printing apparatus according to an embodiment of the present disclosure may contain a polymerizable compound, a polymerization initiator, a coloring material, and other constituents.

1.1. (1) Polymerizable Compound

The polymerizable compound is a compound to be subjected to polymerization with a polymerization initiator and is not otherwise limited. The polymerizable compound may be a monofunctional, bifunctional, or a higher multifunctional monomer or oligomer. Examples of such a monomer include unsaturated carboxylic acids and salts or esters thereof, such as (meth)acrylic acid, itaconic acid, crotonic acid, isocrotonic acid, and maleic acid; urethane; amides and anhydrides thereof; acrylonitrile; styrene; and unsaturated polyesters, unsaturated polyethers, unsaturated polyamides, and unsaturated urethanes.

Examples of such an oligomer include oligomers produced from the above-cited monomers, such as linear acrylic oligomers, epoxy (meth)acrylates, oxetane (meth)acrylates, aliphatic urethane (meth)acrylates, aromatic urethane (meth)acrylates, and polyester (meth)acrylates.

The polymerizable compound may be any other monofunctional or multifunctional monomer, for example, an N-vinyl compound. Examples of the N-vinyl compound include N-vinylformamide, N-vinylcarbazole, N-vinylacetamide, N-vinylpyrrolidone, N-vinylcaprolactam, acryloyl morpholine, and derivatives thereof.

In the description of the present disclosure, a "(meth)acrylate" refers to either one or both of an acrylate and a corresponding methacrylate, and a (meth)acrylic compound refers to either one or both of an acrylic compound and a corresponding methacrylic compound. Also, an oligomer refers to a dimer or any other lower polymer, produced by polymerization of a monomer and has a weight average molecular weight of 10000 or less. The weight average molecular weight mentioned herein is a measurement of mass spectrometry.

Examples of such a monofunctional (meth)acrylate include isoamyl (meth)acrylate, stearyl (meth)acrylate, lauryl (meth)acrylate, octyl (meth)acrylate, decyl (meth)acrylate, isomyristyl (meth)acrylate, isostearyl (meth)acrylate, 2-ethylhexyl diglycol (meth)acrylate, 2-hydroxybutyl (meth)acrylate, butoxyethyl (meth)acrylate, ethoxy diethylene glycol (meth)acrylate, methoxy diethylene glycol (meth)acrylate, methoxy polyethylene glycol (meth)acrylate, methoxy propylene glycol (meth)acrylate, tetrahydrofurfuryl (meth)acrylate, isobornyl (meth)acrylate, 2-hydroxyethyl (meth)acrylate, 2-hydroxypropyl (meth)acrylate, flexible lactone-modified (meth)acrylate, t-butylcyclohexyl (meth)acrylate, dicyclopentanyl (meth)acrylate, and dicyclopentenyloxyethyl (meth)acrylate.

Exemplary bifunctional (meth)acrylates include 1,6-hexanediol di(meth)acrylate, 1,10-decanediol di(meth)acrylate, 2,4-dimethyl-1,5-pentanediol di(meth)acrylate, ethoxylated cyclohexane methanol di(meth)acrylate, polyethylene glycol di(meth)acrylate, oligoethylene glycol di(meth)acrylate, 2-ethyl-2-butyl-butanediol di(meth)acrylate, hydroxypivalic acid neopentyl glycol di(meth)acrylate, ethylene oxide (EO)-modified bisphenol A di(meth)acrylate, bisphenol F polyethoxy di(meth)acrylate, polyethylene glycol di(meth)acrylate, polypropylene glycol di(meth)acrylate, oligopropylene glycol di(meth)acrylate, 2-ethyl-2-butylpropanediol di(meth)acrylate, 1,9-nonanediol di(meth)acrylate, propoxylated-ethoxylated bisphenol A di(meth)acrylate, tricyclodecane di(meth)acrylate, polytetramethylene glycol di(meth)acrylate, acrylated amine compounds produced by a reaction of 1,6-hexanediol di(meth)acrylate with an amine compound, 1,6-hexanediol di(meth)acrylate, bisphenol A-ethylene oxide (EO) adduct di(meth)acrylate, and bisphenol A-propylene oxide (PO) adduct di(meth)acrylate.

Exemplary trifunctional (meth)acrylates include trimethylolpropane tri(meth)acrylate, trimethylolethane tri(meth)acrylate, alkylene oxide-modified trimethylolpropane tri(meth)acrylate, pentaerythritol tri(meth)acrylate, dipentaerythritol tri(meth)acrylate, trimethylolpropane tri((meth)acryloyloxypropyl) ether, isocyanuric acid alkylene oxide-modified tri(meth)acrylate, propionic acid dipentaerythritol tri(meth)acrylate, tri((meth)acryloyloxyethyl) isocyanurate, hydroxypivalic aldehyde-modified dimethylolpropane tri(meth)acrylate, sorbitol tri(meth)acrylate, glycerin propoxy tri(meth)acrylate, propoxylated trimethylolpropane tri(meth)acrylate, ethoxylated glycerin triacrylate, and caprolactone-modified trimethylolpropane tri(meth)acrylate.

Exemplary tetrafunctional (meth)acrylates include pentaerythritol tetra(meth)acrylate, sorbitol tetra(meth)acrylate, ditrimethylolpropane tetra(meth)acrylate, propionic acid dipentaerythritol tetra(meth)acrylate, and ethoxylated pentaerythritol tetra(meth)acrylate.

Exemplary pentafunctional (meth)acrylates include sorbitol penta(meth)acrylate, dipentaerythritol penta(meth)acrylate, ditrimethylolpropane penta(meth)acrylate, propionic acid-modified dipentaerythritol penta(meth)acrylate, propionic acid-modified tripentaerythritol penta(meth)acrylate, propionic acid-modified tetrapentaerythritol penta(meth)acrylate, and EO or PO adducts thereof.

Exemplary hexafunctional (meth)acrylates include sorbitol hexa(meth)acrylate, ditrimethylolpropane hexaacrylate, dipentaerythritol hexa(meth)acrylate, tripentaerythritol hexa(meth)acrylate, alkylene oxide-modified phosphazene hexa(meth)acrylate, caprolactone-modified dipentaerythritol hexa(meth)acrylate, propionic acid-modified tri pentaerythritol hexa(meth)acrylate, propionic acid-modified tetrapentaerythritol hexa(meth)acrylate, and EO or PO adducts thereof.

Exemplary heptafunctional or higher functional (meth)acrylates include tripentaerythritol hepta(meth)acrylate, propionic acid-modified tripentaerythritol hepta(meth)acrylate, propionic acid-modified tetrapentaerythritol hepta(meth)acrylate, tripentaerythritol octa(meth)acrylate, propionic acid-modified tetrapentaerythritol octa(meth)acrylate, tetrapentaerythritol nona(meth)acrylate, propionic acid-modified tetrapentaerythritol nona(meth)acrylate, tetrapentaerythritol deca(meth)acrylate, pentaerythritol undeca(meth)acrylate, pentaerythritol dodeca(meth)acrylate, and EO or PO adducts thereof.

The radiation-curable ink used in the present embodiment may contain a (meth)acrylic ester having a vinyl ether group, represented by the following general formula (a): $CH_2=CR^1-COOR^2-O-CH=CH-R^3$, wherein $R^1$ represents a hydrogen atom or a methyl group, $R^2$ represents a divalent organic residue having a carbon number of from 2 to 20, and $R^3$ represents a hydrogen atom or a monovalent organic residue having a carbon number of from 1 to 11.

Examples of such a meth)acrylic ester having a vinyl ether group include 2-vinyloxyethyl (meth)acrylate, 3-vinyloxypropyl (meth)acrylate, 1-methyl-2-vinyloxyethyl (meth)acrylate, 2-(2-vinyloxyethoxy)ethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethylcyclohexylmethyl (meth)acrylate, 3-vinyloxymethylcyclohexylmethyl (meth)acrylate, 2-vinyloxymethylcyclohexylmethyl (meth)acrylate, p-vinyloxymethylphenylmethyl (meth)acrylate, m-vinyloxymethylphenylmethyl (meth)acrylate, o-vinyloxymethylphenylmethyl (meth)acrylate, 2-(vinyloxyethoxy)ethyl (meth)acrylate, 2-(vinyloxyisopropoxy)ethyl (meth)acrylate, 2-(vinyloxyethoxy)propyl (meth)acrylate, 2-(2-vinyloxyethoxy)isopropyl (meth)acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethylene glycol monovinyl ether (meth)acrylate, and polypropylene glycol monovinyl ether (meth)acrylate.

By adding a (meth)acrylic ester having a vinyl ether group represented by general formula (a) as a polymerizable compound, the curability of the radiation-curable ink can be dramatically increased without increasing viscosity. One of the reasons for this is that such a compound is a bifunctional monomer having in the molecule both a (meth)acryloyl group and a vinyl ether group that are different in polymerizability.

The radiation-curable ink may further contain a compound belonging to glycol-based di(meth)acrylate. Examples of such a compound include ethylene glycol di(meth)acrylate, diethylene glycol di(meth)acrylate, triethylene glycol di(meth)acrylate, propylene glycol di(meth)acrylate, dipropylene glycol di(meth)acrylate, tripropylene glycol di(meth)acrylate, 1,4-butanediol di(meth)acrylate, 1,3-butanediol di(meth)acrylate, dibutylene glycol di(meth)acrylate, tributylene glycol di(meth)acrylate, tetrabutylene glycol di(meth)acrylate, 1,5-pentanediol di(meth)acrylate, 1,4-pentanediol di(meth)acrylate, 1,3-pentanediol di(meth)acrylate, dipentylene glycol di(meth)acrylate, tripentylene glycol di(meth)acrylate, cyclopentanediol di(meth)acrylate, and neopentyl glycol di(meth)acrylate.

The (meth)acrylate added as a polymerizable compound may have one or more saturated or unsaturated alicyclic skeletons. Such a skeleton acts to adjust the glass transition temperature of the cured product of the ink. Examples of (meth)acrylates having a saturated alicyclic skeleton include isobornyl (meth)acrylate, t-butylcyclohexyl (meth)acrylate, and dicyclopentanyl (meth)acrylate. An example of (meth)acrylates having an unsaturated alicyclic skeleton is dicyclopentenyloxyethyl (meth)acrylate.

Also, the (meth)acrylate added as a polymerizable compound may have an aromatic ring skeleton. Examples of (meth)acrylates having an aromatic ring skeleton include phenoxyethyl (meth)acrylate, 2-hydroxy-3-phenoxypropyl (meth)acrylate, benzyl (meth)acrylate, phenoxydiethylene glycol (meth)acrylate, nonylphenoxyethyl (meth)acrylate, and alkoxylated phenoxyethyl (meth)acrylate.

A single polymerizable compound may be used, or two or more polymerizable compounds may be used in combination. The lower limit of the total content of the polymerizable compound(s) may be, but is not limited to, 30.0% by mass or more, 50.0% by mass or more, or 60.0% by mass or more relative to the total mass (100% by mass) of the radiation-curable ink. In some embodiments, it may be 70.0% by mass or more. Also, the upper limit of the total content of the polymerizable compound(s) may be, but is not limited to, 95.0% by mass or less, 90.0% by mass or less, or 85.0% by mass or less relative to the total mass (100% by mass) of the radiation-curable ink. In some embodiments, it may be 80.0% by mass or less.

1.1. (2) Polymerization Initiator

The polymerization initiator contained in the radiation-curable ink according to the present embodiment is used for polymerization caused by irradiation with radiation, such as ultraviolet (UV) light, to cure the ink, thus forming print. UV light is favorable in terms of safety, and the use thereof as radiation reduces the cost of the light source. Any polymerization initiator may be used without particular limitation, provided that the polymerization initiator can produce active species, such as radicals or cations, with radiation (UV) energy, and initiates the polymerization of the polymerizable compound in the ink. For example, a photoradical polymerization initiator or a photo-cationic polymerization initiator may be used. In some embodiments, a photoradical polymerization initiator may be used.

Examples of the photoradical polymerization initiator include aromatic ketones, acylphosphine oxide compounds, aromatic onium salt compounds, organic peroxides, thio compounds (such as thioxanthone compounds and thiophenyl group-containing compounds), hexaaryl biimidazole compounds, ketoxime ester compounds, borate compounds, azinium compounds, metallocene compounds, active ester compounds, compounds having a carbon-halogen bond, and alkylamine compounds.

In some embodiments, at least either an acylphosphine oxide compound or a thioxanthone compound may be used. Such a compound increases the curability of the ink.

More specifically, examples of the photoradical polymerization initiator include acetophenone, acetophenone benzyl ketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyldimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, bis(2,4,6-trimethylbenzoyl)phenylphosphine oxide, 2,4,6-trimethylbenzoyldiphenylphosphine oxide, 2,4-diethylthioxanthone, and bis-(2,6-dimethoxybenzoyl)-2,4,4-trimethylpentylphosphine oxide.

In some embodiments, 2,4,6-trimethylbenzoyldiphenylphosphine oxide, bis(2,4,6-trimethylbenzoyl)phenylphosphine oxide, or 2,4-diethylthioxanthone may be used.

The photoradical polymerization initiator is commercially available, and examples thereof include IRGACURE 651 (2,2-dimethoxy-1,2-diphenylethan-1-one), IRGACURE 184 (1-hydroxycyclohexyl phenyl ketone), DAROCUR 1173 (2-hydroxy-2-methyl-1-phenylpropan-1-one), IRGACURE 2959 (1-[4-(2-hydroxyethoxy)phenyl]-2-hydroxy-2-methyl-1-propan-1-one), IRGACURE 127 (2-hydroxy-1-{4-[4-(2-hydroxy-2-methylpropionyl)benzyl]phenyl}-2-methyl-propan-1-one), IRGACURE 907 (2-methyl-1-(4-methylthiophenyl)-2-morpholinopropan-1-one), IRGACURE 369 (2-benzyl-2-dimethylamino-1-(4-morpholinophenyl)butanone-1), IRGACURE 379 (2-(dimethylamino)-2-[(4-methylphenyl)methyl]-1-[4-(4-morpholinyl)phenyl]-1-butanone), DAROCUR TPO (2,4,6-trimethylbenzoyldiphenylphosphine oxide), IRGACURE 819 (bis(2,4,6-trimethylbenzoyl)phenylphosphine oxide), IRGACURE TPO (2,4,6-trimethylbenzoyldiphenylphosphine oxide), IRGACURE 784 (bis(η5-2,4-cyclopentadien-1-yl)-bis(2,6-difluoro-3-(1H-pyrrol-1-yl)phenyl) titanium), IRGACURE OXE 01 (1,2-octanedione, 1-[4-(phenylthio)-, 2-(O-benzoyloxime)]), IRGACURE OXE 02 (ethanone, 1-[9-ethyl-6-(2-methylbenzoyl)-9H-carbazol-3-yl]-, 1-(O-acetyloxime)), and IRGACURE 754 (mixture of oxyphenylacetic acid, 2-[2-oxo-2-phenylacetoxyethoxy]ethyl ester, and 2-(2-hydroxyethoxy)ethyl ester) (all produced by BASF); KAYACURE DETX-S (2,4-diethylthioxanthone) (produced by Nippon Kayaku Co. Ltd.); Lucirin TPO, LR8893, and LR8970 (all produced by BASF); and Ubecryl P36 (produced by UCB).

Such photopolymerization initiators may be used individually or in combination.

From the viewpoint of increasing the curability of the radiation-curable ink and avoiding stain with the photopolymerization initiator or a residue of undissolved photopolymerization initiator, the photopolymerization initiator content may be in the range of 1.0% by mass to 20.0% by mass relative to the total mass (100% by mass) of the radiation-curable ink.

For the polymerization initiator containing an acylphosphine oxide compound, the content thereof may be in the range of 7.0% by mass to 15.0% by mass, 8.0% by mass to 15.0% by mass, or 10.0% by mass to 14.0% by mass relative to the total mass (100% by mass) of the radiation-curable ink. When the content of such a polymerization initiator is in such a range, the polymerization initiator can be sufficiently dissolved in the radiation-curable ink, and the resulting radiation-curable ink can exhibit high curability.

For the polymerization initiator containing a thioxanthone compound, the content thereof may be in the range of 0.5% by mass to 4.0% by mass or 1.0% by mass to 3.0% by mass relative to the total mass (100% by mass) of the radiation-curable ink. When the content of such a polymerization initiator is in such a range, the radiation-curable ink can exhibit high curability.

1.1. (3) Coloring Material

The radiation-curable ink used in the present embodiment may further contain a coloring material. The coloring material may be either one or both of a pigment and a dye.

Pigment

The use of a pigment enhances the weather resistance of the radiation-curable ink. The pigment may be an inorganic pigment or an organic pigment.

Examples of the inorganic pigment include carbon blacks (C.I. Pigment Black 7), such as furnace black, lamp black, acetylene black, and channel black; iron oxide; and titanium oxide.

Examples of the organic pigment include azo pigments, such as insoluble azo pigments, condensed azo pigments, azo lake, and chelate azo pigments; polycyclic pigments, such as phthalocyanine pigments, perylene and perinone pigments, anthraquinone pigments, quinacridone pigments, dioxane pigments, thioindigo pigments, isoindolinone pigments, and quinophthalone pigments; dye chelates, such as basic dye chelates and acid dye chelates; dye lakes, such as basic dye lakes and acid dye lakes; and nitro pigments, nitroso pigments, aniline black, and daylight fluorescent pigments.

Examples of black pigments include No. 2300, No. 900, MCF 88, No. 33, No. 40, No. 45, No. 52, MA 7, MA 8, MA 100, and No. 2200B (all produced by Mitsubishi Chemical Corporation); Raven 5750, Raven 5250, Raven 5000, Raven 3500, Raven 1255, and Raven 700 (all produced by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all available from Cabot JAPOAN K.K.); and Color Black FW1, Color Black FW2, Color Black FW2V, Color Black FW18, Color Black FW200, Color Black 5150, Color Black 5160, Color Black S170, Printex 35, Printex U, Printex V, Printex 140U, Special Black 6, Special Black 5, Special Black 4A, and Special Black 4 (all produced by Degussa).

Examples of white pigments include C.I. Pigment Whites 6, 18, and 21 and metal compounds, such as metal oxides, barium sulfate, and calcium carbonate. Examples of the metal oxides include titanium dioxide, zinc oxide, silica, alumina, and magnesium oxide.

Examples of yellow pigments include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of magenta pigments include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245 and C.I. Pigment Violets 19, 23, 32, 33, 36, 38, 43, and 50.

Examples of cyan pigments include C.I. Pigment Blues 1, 2, 3, 15, 15:1, 15:2, 15:3, 15:34, 15:4, 16, 18, 22, 25, 60, 65, and 66 and C.I. Vat Blues 4 and 60.

Pigments that can be used for colors other than magenta, cyan, and yellow include C.I. Pigment Greens 7 and 10, C.I. Pigment Browns 3, 5, 25, and 26, and C.I. Pigment Oranges 1, 2, 5, 7, 13, 14, 15, 16, 24, 34, 36, 38, 40, 43, and 63.

The above-cited pigments may be used individually or in combination.

When any one of the above-cited pigments is used, the average particle size of the pigment may be 300.0 nm or less and may be in the range of 50.0 nm to 200.0 nm. When the pigment has such an average particle size, the radiation-curable ink can be reliable in terms of, for example, ejection consistency and dispersion stability, accordingly forming high-quality images. Average particle size mentioned herein is a value measured by dynamic light scattering.

Dye

A dye may be used as the color material. The dye may be, but is not limited to, an acid dye, a direct dye, a reactive dye, or a basic dye. Examples of such a dye include C.I. Acid Yellows 17, 23, 42, 44, 79, and 142, C.I. Acid Reds 52, 80, 82, 249, 254, and 289, C.I. Acid Blues 9, 45, and 249, C.I. Acid Blacks 1, 2, 24, and 94, C.I. Food Blacks 1 and 2, C.I. Direct Yellows 1, 12, 24, 33, 50, 55, 58, 86, 132, 142, 144, and 173, C.I. Direct Reds 1, 4, 9, 80, 81, 225, and 227, C.I. Direct Blues 1, 2, 15, 71, 86, 87, 98, 165, 199, and 202, C.I. Direct Blacks 19, 38, 51, 71, 154, 168, 171, and 195, and C.I. Reactive Reds 14, 32, 55, 79, and 249, and C.I. Reactive Blacks 3, 4, and 35.

Such dyes may be used individually or in combination. Both a pigment and a dye may be used in combination. The coloring material content may be 0.5% by mass to 10% by mass relative to the total mass (100% by mass) of the radiation-curable ink from the viewpoint of obtaining satisfactory color reproductivity.

1.1. (4) Other Constituents

The radiation-curable ink used in the present embodiment may further contain a dispersant. For the radiation-curable ink containing a pigment, a dispersant may be added for favorable dispersion of the pigment. The dispersant may be, but is not limited to, a polymer dispersant or the like that is conventionally used for preparing a pigment dispersion. Examples of such a polymer dispersant include polyoxyalkylene polyalkylene polyamines, vinyl polymers and copolymers, acrylic polymers and copolymers, polyesters, polyamides, polyimides, polyurethanes, amino polymers, silicon-containing polymers, sulfur-containing polymers, fluorine-containing polymers, and epoxy resins. The polymer dispersant may contain at least one of these polymers. The polymer dispersant may be commercially available, and examples thereof include Discol series produced by Dai-ichi Kogyo Seiyaku Co., Ltd., Solsperse series, such as Solsperse 36000, produced by Lubrizol Corporation, and Disper BYK series produced by BYK Chemie.

The radiation-curable ink used in the present embodiment may further contain a slipping agent from the viewpoint of increasing rub fastness. The slipping agent may be, but is not limited to, a silicone surfactant. The silicone surfactant may be a polyester-modified or polyether-modified silicone. In some embodiments, polyether-modified polydimethylsiloxane or polyester-modified polydimethylsiloxane may be used. Examples of such a slipping agent include BYK-347, BYK-348, BYK-UV3500, -UV3510, -UV3530, and -UV3570 (all available from BYK Japan KK).

The radiation-curable ink used in the present embodiment may further contain a polymerization inhibitor. The use of a polymerization inhibitor increases the storage stability of the radiation-curable ink. The polymerization inhibitor may be, but is not limited to, at least one selected from the group consisting of phenol compounds, hydroquinone compounds, and quinone compounds. More specifically, examples of such a polymerization inhibitor include hydroquinone, p-methoxyphenol, cresol, t-butylcatechol, 3,5-di-t-butyl-4-hydroxytoluene, 2,2'-methylenebis(4-methyl-6-t-butylphenol), 2,2'-methylenebis(4-ethyl-6-butylphenol), and 4,4'-thiobis(3-methyl-6-t-butylphenol). A commercially available polymerization inhibitor, such as IRGASTAB UV10 or UV22 (both produced by BASF), may be used.

The radiation-curable ink used in the present embodiment may further contain other constituents or additives. Such constituents include known additives including a polymerization promoter (sensitizing dye or the like) and a penetration enhancer. Other additives include a fixing agent, a fungicide, a preservative, an antioxidant, an ultraviolet absorbent, a chelating agent, a pH adjuster, and a thickener.

1.1. (5) Surface Tension of Radiation-Curable Ink

The radiation-curable ink used in the ink jet printing apparatus of the present embodiment has a surface tension of 25.0 mN/m or less. From the viewpoint of increasing the surface wettability of the radiation-curable ink on the printing medium, the surface tension of the radiation-curable ink may be 22.0 mN/m or less or 20.0 mN/m or less. On the other hand, from the viewpoint of increasing the contact angle with the nozzle face of the printing head when the ink sticks to the nozzle face, the surface tension of the radiation-curable ink may be controlled to 22.0 mN/m or more.

The surface tension of the radiation-curable ink may be controlled by, for example, varying the polymerizable compound and/or other additives and the proportions thereof.

1.2. Printing Head

The ink jet printing apparatus of the present embodiment includes a printing head. The printing head has a nozzle face having openings of nozzles through which the radiation-curable ink is ejected. The nozzle face is provided with a liquid-repellent film thereon. The ink jet printing apparatus including the printing head will first be described, followed by a description of the liquid-repellent film.

1.2.1. Structure of Ink Jet Printing Apparatus

The ink jet printing apparatus of the present embodiment will now be described. The ink jet apparatus includes a printing head configured to apply the radiation-curable ink onto a film-like printing medium to form a coating, and a radiation irradiation device configured to irradiate the coating with radiation to cure the coating and thus form a cured film.

Figure 2:
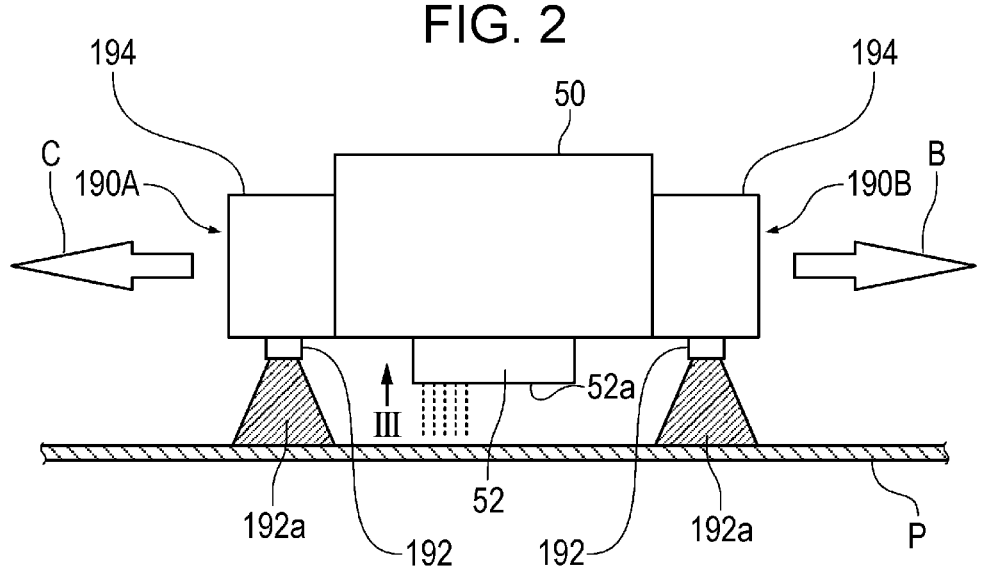
FIG. 2 is a front view of a UV irradiation device used in the printing apparatus shown in FIG. 1.
Figure 3:
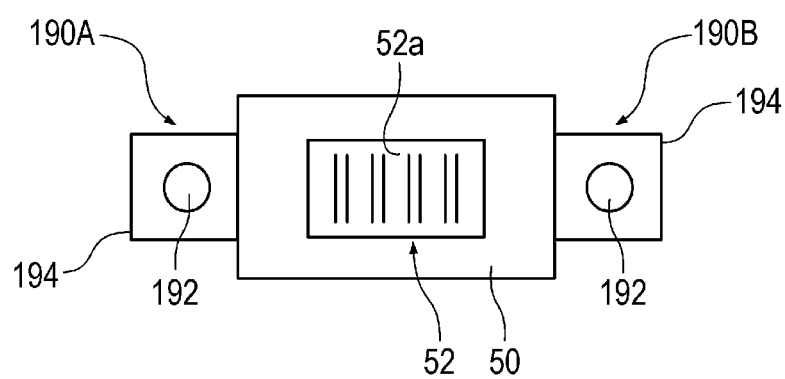
FIG. 3 is an illustrative representation of the irradiation device shown in FIG. 2 viewed in the direction indicated by arrow III.

The ink jet printing apparatus shown in FIG. 1 may be used as the ink jet printing apparatus of the present embodiment. FIG. 1 is a perspective view of the ink jet printing apparatus according to an embodiment of the present disclosure. FIG. 2 is a front view of UV irradiation devices 90A (190A in FIG. 2) and 90B (190B in FIG. 2) shown in FIG. 1. FIG. 3 is an illustrative representation of the irradiation device shown in FIG. 2 viewed in the direction of arrow III.

The ink jet printing apparatus 20 shown in FIG. 1 includes a motor 30 operable to transport the printing medium P in a sub-scanning direction SS, a platen 40, a printing head 52 operable to eject very small droplets of the radiation-curable ink through the nozzles onto the printing medium P, a carriage 50 on which the printing head 52 is mounted, a carriage motor 60 operable to move the carriage 50 in a scanning direction MS, and a pair of UV irradiation devices 90A and 90B operable to irradiate droplets of the radiation-curable ink applied onto the printing medium P from the printing head 52 with radiation.

The carriage 50 is drawn by a traction belt 62 driven by the carriage motor 60, thereby moving along a guide rail 64.

The printing head 52, which is mounted in the carriage 50, is moved in the scanning direction MS by the movement of the carriage 50 in the scanning direction MS.

The printing head 52 is operable to eject the radiation-curable ink. In the embodiment shown in FIG. 1, the printing head 52 is a color printing serial head operable to eject four color inks, each ejected through a plurality of nozzles assigned to the color ink. In the carriage 50 in which the printing head 52 is mounted, a black cartridge 54 that is a black ink container charged with a black ink to be fed to the printing head 52 and a color ink cartridge 56 that is a color ink container charged with a color ink to be fed to the printing head 52 are also mounted. The inks in the cartridges 54 and 56 are radiation-curable.

In an operation of forming a coating with a radiation-curable ink, the volume of droplets ejected from the printing head 52 may be in the range of 1 pL to 20 pL per dot. By controlling the volume of droplets in this range, the radiation-curable ink can be consistently ejected, thus forming high-quality images.

The carriage 50 is provided with a capping device 80 at the home position thereof (on the right side of FIG. 1). The capping device 80 is operable to cover the nozzle face 52*a* of the printing head 52 when the printing head is stopped. On completing a printing job, the carriage 50 returns to the position right above the capping device 80, and the capping device 80 is automatically lifted by a mechanism (not shown) to cover the nozzle face 52*a* of the printing head 52. This capping operation prevents the ink in the nozzles from drying or deteriorating. The carriage 50 is positioned, for example, so as to be accurately aligned with the position of the capping device 80.

A wiping unit (not shown) may be provided at the home position (on the right side of FIG. 1) of the carriage 50 to wipe the nozzle face 52*a* of the printing head 52 when a printing operation is stopped. The wiping unit is disposed so as not to interfere with the capping device 80 and is configured so that the wiper blade, or squeegee, thereof rubs the nozzle face 52*a* of the printing head 52 to remove droplets or mist stuck to the nozzle face 52*a* and/or the cured product of the droplets or mist.

The ink jet printing apparatus 20 having such a structure is operable to eject and apply droplets of the radiation-curable ink onto a printing medium to form a coating on the printing medium. The ink jet printing apparatus 20 performs the operation of forming a coating and the operation of curing the coating in a continuous process in one apparatus without using individual devices for the respective operations.

The radiation may be UV light or visible light. In some embodiments, UV light may be used to cure a UV-curable ink used as the radiation-curable ink from the viewpoint of preventing the ink from being cured by environmental light and allowing easy handling. The radiation irradiation divide may be the UV irradiation device shown in FIGS. 1 and 2.

As shown in FIGS. 1 to 3, the UV irradiation devices 190A and 190B are disposed on both ends of the carriage 50 in the direction in which the carriage 50 moves.

The UV irradiation device 190A to the left of the printing head 52 irradiates the droplets ejected onto the printing medium P with UV light during scanning in the right direction in which the carriage 50 moves to the right (in the direction indicated by arrow B in FIG. 2) as shown in FIG. 2. The UV irradiation device 190B to the right of the printing head 52 irradiates the droplets ejected onto the printing medium P with UV light during scanning in the left direction in which the carriage 50 moves to the left (in the direction indicated by arrow C in FIG. 2) as shown in FIG. 2.

The UV irradiation devices 190A and 190B, which are attached to the carriage 50, each includes a housing 194 holding a UV light source 192 and a light source control circuit (not shown) operable to control the turn-on and turn-off of the UV light source 192. In the embodiment shown in FIGS. 2 and 3, the UV irradiation devices 190A and 190B are each provided with a single UV light source 192. In another embodiment, however, each irradiation device may have two or more UV light sources. The UV light source 192 may be an LED (light emitting diode) or an LD (laser diode). Such a light source does not require a filter or the like unlike other light sources such as mercury lamps and metal halide lamps, accordingly avoiding an increase in size thereof due to the filter. In addition, since the radiation emitted from the light source is not absorbed by the filter, the radiation maintains an intensity sufficient to cure the radiation-curable ink efficiently.

The wavelength of the radiation emitted from the UV light sources 192 may be the same or different. When an LED or an LD is used as the UV light source 192, the wavelength of the radiation emitted therefrom is in the range of 350.0 nm to 430.0 nm.

When the UV irradiation devices 190A and 190B are used, the UV light sources 192 emit radiation 192*a* to a portion of the printing medium P in the vicinity of the printing head 52, as shown in FIG. 2, to irradiate the droplets applied onto the printing medium P by ejection from the printing head 52, thus curing at least the surface of the droplets to form an image.

A process for forming an image in a desired region that is performed by repeating the operations of forming a coating and curing the coating will now be described in detail.

First, droplets of one or more color radiation-curable inks are ejected onto the printing medium P and irradiated with the radiation from the UV irradiation device 190A with the carriage 50 moving in the right direction (the direction indicated by arrow B in FIG. 2). Then, the printing medium P is transported in the sub-scanning direction SS. In the description disclosed herein, the operation of ejecting droplets with the carriage 50 moving in either of the scanning directions MS and irradiating the droplets with radiation is referred to as scanning, and one time of scanning may be referred to as one pass.

Subsequently, droplets of one or more colors are ejected onto the printing medium P and irradiated with the radiation from the UV irradiation device 190B with the carriage 50 moving in the left direction (the direction indicated by arrow C in FIG. 2) in the same manner as above, thus further performing scanning once (one pass). At this time, the coating on the printing medium is irradiated with radiation from the UV irradiation devices 190A and 190B. Then, the printing medium P is transported in the sub-scanning direction SS.

Up to the operation just described, the coating formed by the first pass is irradiated with radiation by two passes. More specifically, this coating is subjected to irradiation once by the first pass and then subjected to irradiation twice, hence three times in total, by the second pass. On the other hand, the coating formed by the second pass is irradiated once with radiation by one pass.

Such a sequence of operations is repeated to form a mass of coatings defining an image in a predetermined region.

The ink jet printing apparatus 20 of the present embodiment may further include an additional radiation irradiation device (not shown) downstream in the sub-scanning direction SS in which the printing medium P is transported. Thus, the coating on the printing medium is fully cured after an image formation on the printing medium has been completed through all the passes that should be performed.

For example, if the cumulative irradiation energy of the radiation emitted from the UV irradiation devices 190A and 190B is not sufficient to fully cure the droplets, including the inner portion, on the printing medium P, the additional radiation irradiation device downstream in the sub-scanning direction SS ensures complete cure of the droplets including the inner portion.

The additional radiation irradiation device may be disposed anywhere provided that it can irradiate the droplets on the printing medium P transported in the sub-scanning direction SS. For example, the additional radiation irradiation device may be disposed above the carriage 50 downstream from the printing head 52 in the sub-scanning direction SS in which the printing medium P is transported. The additional radiation irradiation device downstream in the sub-scanning direction may be the same as the UV irradiation device 190A (190B).

The ink jet printing apparatus 20 of the present embodiment includes the printing head 52, as described above, and the nozzle face 52a of the head is provided with a liquid-repellent film thereon.

1.2.2. Liquid-Repellent Film

The liquid-repellent film is formed at least on the nozzle face 52a having openings of the nozzles of the printing head 52 and may be optionally formed on the inner walls of the nozzles and other portions.

The liquid-repellent film is made of a material on which the radiation-curable ink having a surface tension of 25.0 mN/m or less can form a contact angle of 60.0 degrees or more. Beneficially, the radiation-curable ink having a surface tension of 25.0 mN/m or less can form a contact angle of 64.0 degrees or more with the liquid-repellent film. In some embodiment, the liquid-repellent film may be made of a material on which the radiation-curable ink having a surface tension of 22.0 mN/m or less can have a contact angle of 64.0 degrees or more, enabling the radiation-curable ink having a surface tension of 22.0 mN or less to form a contact angle of 64.0 degrees or more therewith.

The contact angle between the radiation-curable ink and the liquid-repellent film can be measured by, for example, a contact angle meter DropMaster 500 manufactured by Kyowa Interface Science. For example, the contact angle may be measured at an ambient temperature of 25° C. and an ambient humidity of 20% RH.

The liquid-repellent film may contain a fluorine-containing organosilicon compound as the main constituent. The fluorine-containing organosilicon compound content in the liquid-repellent film may be, by mass, 80.0% or more, 90.0% or more, 95.0% or more, or 98.0% or more relative to the total mass (100% by mass) of the liquid-repellent film. Such a liquid-repellent film facilitates the formation of a satisfactory contact angle.

The fluorine-containing organosilicon compound may be a fluoroalkylsilane compound or a perfluoroalkyl ether silane compound. Such a compound is commercially available, and examples thereof include silane coupling agents, such as F8261 produced by Evonik Degussa, Optool DSX series and Optool AES4 series (both produced by Daikin Industries), KY-130 and KY-108 (both produced by Shin-Etsu Chemical), Fluorosurf FG-5020 (produced by Fluoro Technology), and Dow 2634 Coating (produced by Dow Corning Toray). Alkylsilane compounds include methyltrimethoxysilane, ethyltrimethoxysilane, dimethyldimethoxysilane, phenyltrimethoxysilane, and methyltriethoxysilane. These compounds are commercially available, and examples thereof include KBM-13, KBM-22, KBM-103, and KBE-13 (all produced by Shin-Etsu Chemical). One example of commercially available silazane compounds is hexamethyldisilazane SZ31 (produced by Shin-Etsu Chemical). Silicone compounds are commercially available, and examples thereof include dimethyl silicones such as YF 3800 and YF 3905 (both produced by Momentive Performance Materials) and KF-8010 and KF-8012 (both produced by Shin-Etsu Chemical). Such compounds may be used individually or in combination.

The fluorine-containing organosilicon compound may be a reagent, such as (3,3,4,4,5,5,6,6,7,7,8,8,8-tridecafluorooc-tyl)trimethoxysilane, 1H,1H,2H,2H-nonafluorohexyltrimethoxysilane, or 1H,1H,2H,2H-heptadecafluorodecyltrimethoxysilane.

The liquid-repellent film may be formed by applying a solution containing the constituents of the film onto the nozzle face 52a, followed by drying. Examples of the solvent used in such a solution for forming the liquid-repellent film include lower alcohols, such as methanol, ethanol, 1-propanol, 2-propanol, and butanol; ketones, such as acetone, methyl ethyl ketone, methyl isobutyl ketone, and methyl n-butyl ketone; esters, such as ethyl acetate and butyl acetate; hydrocarbons, such as hexane, toluene, benzene, and xylene; ethers, such as diethyl ether and diisopropyl ether; and mixtures thereof. Fluorocarbon solvents, such as hydrofluorocarbon, perfluorocarbon, perfluoroether, and hydrofluoroether, may be used. In some embodiments, a lower alcohol, such as isopropyl alcohol, may be used. Lower alcohols sufficiently dissolve fluoroalkylsilane compounds and acid catalysts. In addition, the use of a lower alcohol facilitates the application of the solution for forming the liquid-repellent film (makes it easy to spread the solution), and the solution can be dried in an appropriate time.

The solution containing the constituents of the liquid-repellent film may be applied onto the nozzle face 52a by immersion, squeegeeing, brush painting, nozzle flow coating, dipping, spraying, roll coating, flexography, curtain flow coating, spin coating, screen printing, ink jet, or a combination thereof. In some embodiments, the application may be performed by immersion or dipping from the viewpoint of forming a highly uniform liquid-repellent film. The nozzle face 52a may be cleaned with water, an acid, or an alkali before the application of the solution for forming the liquid-repellent film.

The contact angle between the radiation-curable ink and the liquid-repellent film can be controlled by varying one or more constituents of the liquid-repellent film, the number of the constituents of the film, and the proportions of the constituents.

The liquid-repellent film may contain a compound having a perfluoroalkyleneoxy structure. The perfluoroalkyleneoxy structure may be the tetrafluoroethyleneoxy structure represented by the following formula (I): —(CF$_2$)$_2$—O—.

Examples of the compound having the structure represented by formula (I) include compounds represented by the following formula (Ia):

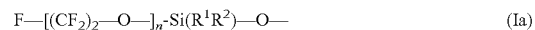

$$F-[(CF_2)_2-O-]_n-Si(R^1R^2)-O- \quad (Ia)$$

wherein n represents an integer of 1 to 50, R$^1$ and R$^2$ each independently a chemical species selected from the group consisting of oxygen, alkyl groups having a carbon number of 1 to 4, alkylene groups having a carbon number of 1 to 4, alkoxy groups having a carbon number of 1 to 4, and oxyalkylene groups having a carbon number of 1 to 4; and compounds represented by the following formula (Ib):

$$-(CF_2)_n-O-Si(R^1R^2)-O- \quad (Ib)$$

wherein m represents an integer of 1 to 50, R$^1$ and R$^2$ each independently a chemical species selected from the group consisting of oxygen, alkyl groups having a carbon number of 1 to 4, alkylene groups having a carbon number of 1 to 4, alkoxy groups having a carbon number of 1 to 4, and oxyalkylene groups having a carbon number of 1 to 4.

The tetrafluoroethyleneoxy structure —(CF$_2$)$_2$—O— (formula (I)) is present in the molecule of a compound contained in the liquid-repellent film, that is, in the molecular of a compound derived from fluoroalkylsilane, perfluoropolyether silane, or the like.

The structures of the compounds in the liquid-repellent film can be determined by TOF-SIMS (time-of-flight secondary ion mass spectrometry). If the TOF-SIMS secondary ion mass spectrum exhibits the presence of a structure belonging to any of the above structures or the ion thereof, the liquid-repellent film is considered to contain a compound having the formula (I) structure.

The present inventors found that the liquid-repellent film not containing the structure represented by formula (II): —O—CF$_2$—O— enables the radiation-curable ink to form a favorable contact angle therewith.

However, the phrase "not containing the structure represented by formula (II)" does not exclude issues in manufacture, for example, the presence of the structure of (II) as an impurity in the liquid-repellent film, provided that the contact angle between the liquid-repellent film and the radiation-curable ink is 60.0 degrees or more.

1.2.3. Removal of Ink Mist

When the radiation-curable ink is ejected onto a printing medium through the nozzles for printing with an ink jet printing apparatus, very small droplets called mist that do not land on the printing medium are produced. The mist, which is a mass of droplets of the radiation-curable ink, may be suspended in the air or stick onto the nozzle face of the printing head after the ejection through the nozzles.

If mist sticks onto the nozzle face, the mist may interfere with consistent ejection through the nozzles. Accordingly, an ink jet printing apparatus may be provided with a mechanism to remove stuck ink (mist) with a wiper blade. By wiping the nozzle face with the wiper blade, the mist of the radiation-curable ink can be relatively easily removed if it is before being cured.

If the mist of the radiation-curable ink stuck to the nozzle face of the printing head is exposed to leaking radiation or the like, the mist may be cured and become difficult to remove with the wiper blade.

The nozzle face of the ink jet printing apparatus according to the present embodiment is provided with the liquid-repellent film capable of forming a contact angle of 60.0 degrees or more with the radiation-curable ink. The mist stuck onto such a nozzle face can be easily removed with the wiper blade even if it is cured.

The degree of ink mist removal may be estimated by rubbing the mist with a wiper blade or cleaning with a solvent, such as ethyl diglycol acetate or butyl diglycol acetate. Both result in the same tendency.

1.2.4. Printing Medium

The printing medium onto which the ink jet printing apparatus of the present embodiment applies the radiation-curable ink is in the form of a film or a board.

The printing medium may be unabsorbent of liquid, and examples of such a printing medium include films and plates made of a polymer, such as polyvinyl chloride, polyethylene terephthalate, polycarbonate, polystyrene, polyurethane, polyethylene, polypropylene, polyvinyl acetal, and a mixture thereof; films and plates made of cellulose diacetate, cellulose triacetate, cellulose propionate, cellulose butyrate, cellulose acetate butyrate, cellulose nitrate, or the like; and foils and plates made of a metal, such as iron, silver, copper, or aluminum; plates and films on which such a metal is deposited; foils and plates of an alloy, such as stainless steel or brass; and glass plates.

The printing medium may be poorly absorbent of liquid. Such a printing medium may include a coating (liquid-receiving layer) at the surface thereof and, for example, may be any of the above-cited films and plates, coated with a hydrophilic polymer or a layer formed by applying silica or titanium particles with a binder (for example, a hydrophilic polymer, such as polyvinyl alcohol or polyvinylpyrrolidone). The substrate of the printing medium poorly absorbent of liquid may be paper, and an example of such a printing medium is book-printing paper, such as art paper, coated paper, or matte paper.

The printing medium may be absorbent of liquid, and examples thereof include paper sheets, such as plain paper or ink jet printing paper, sheets including an ink-receiving layer, and cloths.

A printing medium poorly absorbent or unabsorbent of liquid refers to a printing medium that is hardly absorbent or not absorbent of liquid. Quantitatively, the printing medium poorly absorbent or unabsorbent of liquid exhibits a water absorption of 10 mL/m$^2$ or less for a period of 30 ms$^{1/2}$ from the beginning of contact with water, measured by the Bristow's method. The Bristow's method is broadly used for measuring liquid absorption in a short time, and Japan Technical Association of the Pulp and Paper Industry (JAPAN TAPPI) officially adopts this method. Details of this method are specified in Standard No. 51 (Paper and Paperboard—Liquid Absorption Test Method—Bristow's Method (in Japanese)) of JAPAN TAPPI Paper and Pulp Test Methods edited in 2000 (in Japanese). In contrast, printing media absorbent of liquid refer to those not belonging to the category of the printing media poorly absorbent or unabsorbent of liquid. In the description disclosed herein, being unabsorbent of liquid, poorly absorbent of liquid, or absorbent of liquid may be merely expressed as being unabsorbent, poorly absorbent, and absorbent, respectively.

The printing medium may be transparent and colorless, translucent, colored and transparent, colored and opaque, or non-colored and opaque. The printing medium itself may be colored or may be transparent or translucent.

In some embodiments, the printing medium may be unabsorbent or absorbent of liquid. In some embodiments, the printing medium may contain a plasticizer. Such a printing medium may be a polyvinyl chloride sheet or film. The type and the content of the plasticizer are not particularly limited provided that the sheet or film is so hard or elastic that images can be formed thereon.

2. Experimental Examples

The subject matter of the present disclosure will be further described in detail with reference to the following Experimental Examples. However, the subject matter of the present disclosure is not limited to the disclosed Examples. In the following description, "%" is on a mass basis unless otherwise specified.

2.1. Preparation of Ink Compositions

The inks used in the Examples were prepared by mixing the constituents in the proportions (unit: mass %) presented in Table 1 and stirring the mixture with a high-speed water-cooled stirrer. For using the pigment (PR122, C.I. Pigment Red 122), a dispersion liquid was prepared in advance with 50% by mass of a dispersant Solsperse 36000 relative to the pigment.

TABLE 1

| Constituent | Ink 1 | Ink 2 |
|---|---|---|
| PEA | 33.5 | 33.5 |
| VEEA | 20.0 | 25.0 |

TABLE 1-continued

| Constituent | Ink 1 | Ink 2 |
|---|---|---|
| DPGDA | 15.0 | 10.0 |
| IBXA | 10.0 | 5.0 |
| n-VC | 7.5 | — |
| ACMO | — | 12.5 |
| 819 | 5.0 | 5.0 |
| TPO | 4.0 | 4.0 |
| MEHQ | 0.1 | 0.1 |
| PR122 | 4.0 | 4.0 |
| Dispersant | 0.4 | 0.4 |
| BYK-UV3500 | 0.5 | 0.5 |
| Surface tension (mN/m) | 22.0 | 24.0 |

The constituents presented in Table 1 are as follows:
PEA: Phenoxyethyl acrylate
VEEA: 2-(2-Vinyloxyethoxy)ethyl acrylate
DPGDA: Dipropylene glycol diacrylate
IBXA: Isobornyl acrylate
n-VC: n-vinylcaprolactam
ACMO: Product name of acryloylmorpholine produced by KJ Chemicals
819: IRGACURE 819 (product name) produced by BASF, polymerization initiator
TPO: IRGACURE TPO (product name) produced by BASF, 2,4,6-trimethylbenzoyldiphenylphosphine oxide
MEHQ: Hydroquinone monomethyl ether, polymerization inhibitor
Pigment: C.I. Pigment Red 122
Dispersant: Solsperse 36000 (product name) produced by LUBRIZOL
BYK-UV3500: Product name of acryloyl group-containing polyether-modified polydimethylsiloxane produced by BYK Additives & Instruments 2.2. Formation of Liquid-Repellent Film Silicon substrates were individually dipped in any of the following solutions prepared for the Examples and dried. Thus, liquid-repellent films were formed.

Experimental Examples 1: Optool DSX-E (produced by Daikin Industries), modified perfluoropolyether (PFPE)
Experimental Example 2: 3,3,4,4,5,5,6,6,7,7,8,8,8-tridecafluorooctyl)trimethoxysilane
Experimental Example 3: KY-130 (produced by Shin-Etsu Chemical), perfluoroalkyl ether silane coupling agent
Experimental Example 4: Octadecyltrimethoxysilane 2.3. Measurement of Contact Angle Inks 1 and 2 were dropped on the liquid-repellent film formed on the silicon substrate in each example, and the contact angles of the inks with the liquid-repellent film were measured with a contact angle meter DropMaster 500 manufactured by Kyowa Interface Science. The measurement was made at an ambient temperature of 25° C. and an ambient humidity of 20% RH. The measurement results are presented in Table 2.

2.4. Mist Removal Test

Ink 1 or ink 2 presented in Table 1 was sprayed onto each silicon substrate having a liquid-repellent film at a rate of 10 to 1000 dots per square millimeters and irradiated with UV light at 1 mW/cm$^2$ or less. The resulting mist on the substrate was cleaned by EDGAC (ethyl diglycol acetate) flowing over the substrate, followed by drying. The surface to which the mist was stuck was observed under an optical microscope before and after the cleaning. The amount of residual mist was rated. The area the mist stuck to was calculated by binarizing the mist residue per unit area. The results are presented in Table 2.

A: After the cleaning, the area of mist was reduced to 20% or less relative to the first area of mist.
B: After the cleaning, the area of mist was reduced to more than 20% and 60% or less relative to the first area of mist.
C: After the cleaning, the area of mist was more than 60% relative to the first area of mist.

TABLE 2

| | Experimental Example 1 | Experimental Example 2 | Experimental Example 3 | Experimental Example 4 |
|---|---|---|---|---|
| Contact angle (°) with ink 1 | 67.1 | 67.5 | 58.5 | 26.2 |
| Contact angle (°) with ink 2 | 64.3 | 66.6 | 54.1 | 17.8 |
| Mist removal | A | A | B | C |

2.5. TOF-SIMS Measurement

The time-of-flight secondary ion mass spectrum of each liquid-repellent film was obtained by using an analyzer model nanoTOF II manufactured by ULVAC. The result of Experimental Example 1 shows that the main constituent was the tetrafluoroethyleneoxy structure represented by formula (I): —(CF$_2$)$_2$—O—, while the content of the structure represented by formula (II): —O—CF$_2$—O— was less than or equal to the detection limit of the analyzer.

In Experimental Example 2, the main constituent was the structure represented by formula (III): CF$_3$—(CF$_2$)$_5$—O—. This result suggests that the main constituent was the tertafluoroethyleneoxy structure represented by formula (I). Also, the content of the structure represented by formula (II) was less than or equal to the detection limit of the analyzer.

In Experimental Example 3, the main constituent was the tetrafluoroethyleneoxy structure represented by formula (I), and the structure represented by formula (II) was detected.

2.6. Relationship between Difluoromethylene Chain Length and Mist Removal

Figure 4:
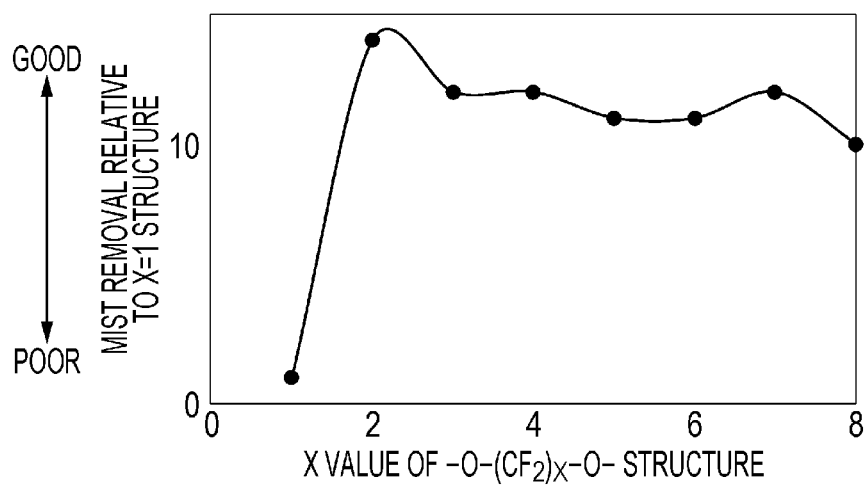
FIG. 4 is a plot representing the relationship between the number of difluoromethylene structures in a liquid-repellent film and the degree of ink mist removal.

FIG. 4 is a plot representing the relationship between the length of the difluoromethylene chain and the degree of mist removal. The horizontal axis of the plot represents the number X of repeating difluoromethylene units, and the vertical axis represents the degree of mist removal relative to the degree of mist removal (=1) when the number X of difluoromethylene units was 1. The degree of mist removal for each X value was determined based on COSMO-RS calculation.

FIG. 4 suggests that the ink or mist can be favorably removed when X (the number of repeating difluoromethylene units) is 2 or more.

2.7. Brief Description of the Results of Experimental Examples

In Experimental Examples 1 and 2, in which the radiation-curable inks having a surface tension of 25.0 mN/m or less formed a contact angle of 60.0 degrees or more, the mist was satisfactorily removed. In Experimental Examples 3 and 4, in which the radiation-curable inks formed a contact angle of less than 60.0 degrees, the mist was not sufficiently removed. In addition, the results of Experimental Examples 1 and 2, in which the liquid-repellent films did not substantially contain the structure of formula (II), suggest that the absence of this structure leads to satisfactory results.

The implementation of the subject matter disclosed herein is not limited to the above-described embodiments, and various modifications may be made. For example, the subject matter disclosed herein may be implemented in substantially the same manner as any of the disclosed embodiments (for example, in terms of function, method, and results, or in terms of purpose and effect). Some elements used in the disclosed embodiments but not essential may be replaced. Implementations capable of producing the same effect as produced in the disclosed embodiments or achieving the same object as in the disclosed embodiments are also within the scope of the subject matter of the present disclosure. A combination of any of the disclosed embodiments with a known art is also within the scope of the subject matter of the present disclosure.

What is claimed is:

1. An ink jet printing apparatus comprising:
a radiation-curable ink having a surface tension of 25.0 mN/m or less; and
a printing head including
a nozzle face having an opening of a nozzle through which the radiation-curable ink is ejected, and
a liquid-repellent film on the nozzle face, the liquid-repellent film containing a perfluoroalkyleneoxy structure, and the liquid repellent film enabling the radiation-curable ink to form a contact angle of 60.0 degrees or more therewith.

2. The ink jet printing apparatus according to claim 1, wherein
the liquid-repellent film contains a fluorine-containing organosilicon compound.

3. The ink jet printing apparatus according to claim 1, wherein
the liquid-repellent film contains the structure represented by the following formula (I): —(CF$_2$)$_2$—O—.

4. The ink jet printing apparatus according to claim 1, wherein
the liquid-repellent film does not contain the structure represented by the following formula (II): —O—CF$_2$—O—.

5. The ink jet printing apparatus according to claim 1, wherein
the surface tension of the radiation-curable ink is 22.0 mN/m or less.

6. The ink jet printing apparatus according to claim 1, wherein
the liquid-repellent film enables the radiation-curable ink to form a contact angle of 64.0 degrees or more therewith.

7. A printing head comprising:
a nozzle face having an opening of a nozzle through which a radiation-curable ink having a surface tension of 25.0 mN/m or less is ejected; and
a liquid-repellent film on the nozzle face, the liquid-repellent film containing a perfluoroalkyleneoxy structure, and the liquid repellent film enabling the radiation-curable ink to form a contact angle of 60.0 degrees or more therewith.

8. The printing head according to claim 7, wherein
the surface tension of the radiation-curable ink is 22.0 mN/m or less.

9. The printing head according to claim 7, wherein
the liquid-repellent film enables the radiation-curable ink to form a contact angle of 64.0 degrees or more therewith.

* * * * *